United States Patent
Diaz et al.

(10) Patent No.: US 10,887,556 B2
(45) Date of Patent: Jan. 5, 2021

(54) REAR-VIEW CAMERA AND LIGHT SYSTEM FOR VEHICLE

(71) Applicant: Alpine Electronics, Inc., Tokyo (JP)

(72) Inventors: Melvin Diaz, Torrance, CA (US); Milan Rabrenovic, Torrance, CA (US); Akitoshi Kitazawa, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 385 days.

(21) Appl. No.: 15/391,411

(22) Filed: Dec. 27, 2016

(65) Prior Publication Data

US 2018/0178723 A1    Jun. 28, 2018

(51) Int. Cl.
| | |
|---|---|
| *B60R 1/00* | (2006.01) |
| *B60R 11/04* | (2006.01) |
| *B60Q 1/26* | (2006.01) |
| *B60Q 1/44* | (2006.01) |
| *B60Q 1/24* | (2006.01) |
| *H04N 5/225* | (2006.01) |
| *H04N 7/18* | (2006.01) |
| *B60Q 1/22* | (2006.01) |

(Continued)

(52) U.S. Cl.
CPC ............... *H04N 7/183* (2013.01); *B60Q 1/22* (2013.01); *B60Q 1/2661* (2013.01); *B60Q 1/302* (2013.01); *B60Q 1/44* (2013.01); *B60R 11/04* (2013.01); *H04N 5/2257* (2013.01); *B60Q 2900/10* (2013.01); *B60R 2011/004* (2013.01); *B60R 2300/103* (2013.01); *B60Y 2400/92* (2013.01)

(58) Field of Classification Search
CPC ........ B60Q 3/258; B60Q 1/22; B60Q 1/2665; B60Q 1/503; B60Q 1/54; B60Q 3/59; B60R 11/0241; B60R 11/0247; B60R 1/04; B60R 1/12; B60R 1/1207; B60R 2001/1253; B60R 2011/0026; B60R 2011/0033; B60R 1/00; B60R 11/04; B60R 2300/8093; B60R 2001/1215; B60R 2300/30; B60R 2300/8026; B60R 1/088; B60R 2300/105; B60R 2300/207

See application file for complete search history.

(56) References Cited

U.S. PATENT DOCUMENTS 4,057,093 A * 11/1977 Joines ................... B60C 25/145 157/1
4,972,742 A * 11/1990 Brown .................. B60B 29/007 81/180.1

(Continued)

FOREIGN PATENT DOCUMENTS

JP    2010-018138    1/2010
JP    2010-173542    8/2010

*Primary Examiner* — Dave Czekaj
*Assistant Examiner* — Kehinde Abimbola
(74) *Attorney, Agent, or Firm* — Muramatsu & Associates

(57) ABSTRACT

A rear-view camera and light system for a vehicle having a rear-view camera, a back light, and a brake light and an attachment structure that attaches the system to a center hub of a spare tire at the back of the vehicle. The rear-view camera and light system includes a mounting base having a plate like shape and configured to attach to a mounting bracket provided on about a center of a back of a vehicle for mounting a spare tire, a mounting post having a cylindrical shape with a hollow therethrough and configured to attach to the mounting base at one end, and a camera/light unit having circular shape and configured to attach to another end of the mounting post.

14 Claims, 13 Drawing Sheets

(51) Int. Cl.
*B60Q 1/30* (2006.01)
*B60R 11/00* (2006.01)

(56) References Cited

U.S. PATENT DOCUMENTS

| | | | | |
|---|---|---|---|---|
| 7,002,620 | B1* | 2/2006 | Rutledge | E21B 47/0002 |
| | | | | 175/45 |
| 8,777,070 | B2* | 7/2014 | Moore | B62D 43/02 |
| | | | | 224/42.13 |
| 10,140,524 | B2* | 11/2018 | Varick | G06K 9/00791 |
| 2004/0231444 | A1* | 11/2004 | Leposky | B60K 17/344 |
| | | | | 74/424 |
| 2005/0046696 | A1* | 3/2005 | Lang | B60Q 1/0023 |
| | | | | 348/148 |
| 2006/0243769 | A1* | 11/2006 | Lovey | B62D 43/02 |
| | | | | 224/517 |
| 2013/0293717 | A1* | 11/2013 | Zhang | H04N 7/181 |
| | | | | 348/149 |
| 2013/0299530 | A1* | 11/2013 | Moore | B60R 11/06 |
| | | | | 224/42.21 |
| 2014/0085409 | A1* | 3/2014 | Zhang | H04N 5/23238 |
| | | | | 348/36 |
| 2014/0104424 | A1* | 4/2014 | Zhang | B60R 1/00 |
| | | | | 348/148 |
| 2014/0114534 | A1* | 4/2014 | Zhang | B60R 1/00 |
| | | | | 701/42 |
| 2017/0072856 | A1* | 3/2017 | Varick | G06K 9/00791 |
| 2018/0086279 | A1* | 3/2018 | Anton | B60R 9/00 |

* cited by examiner

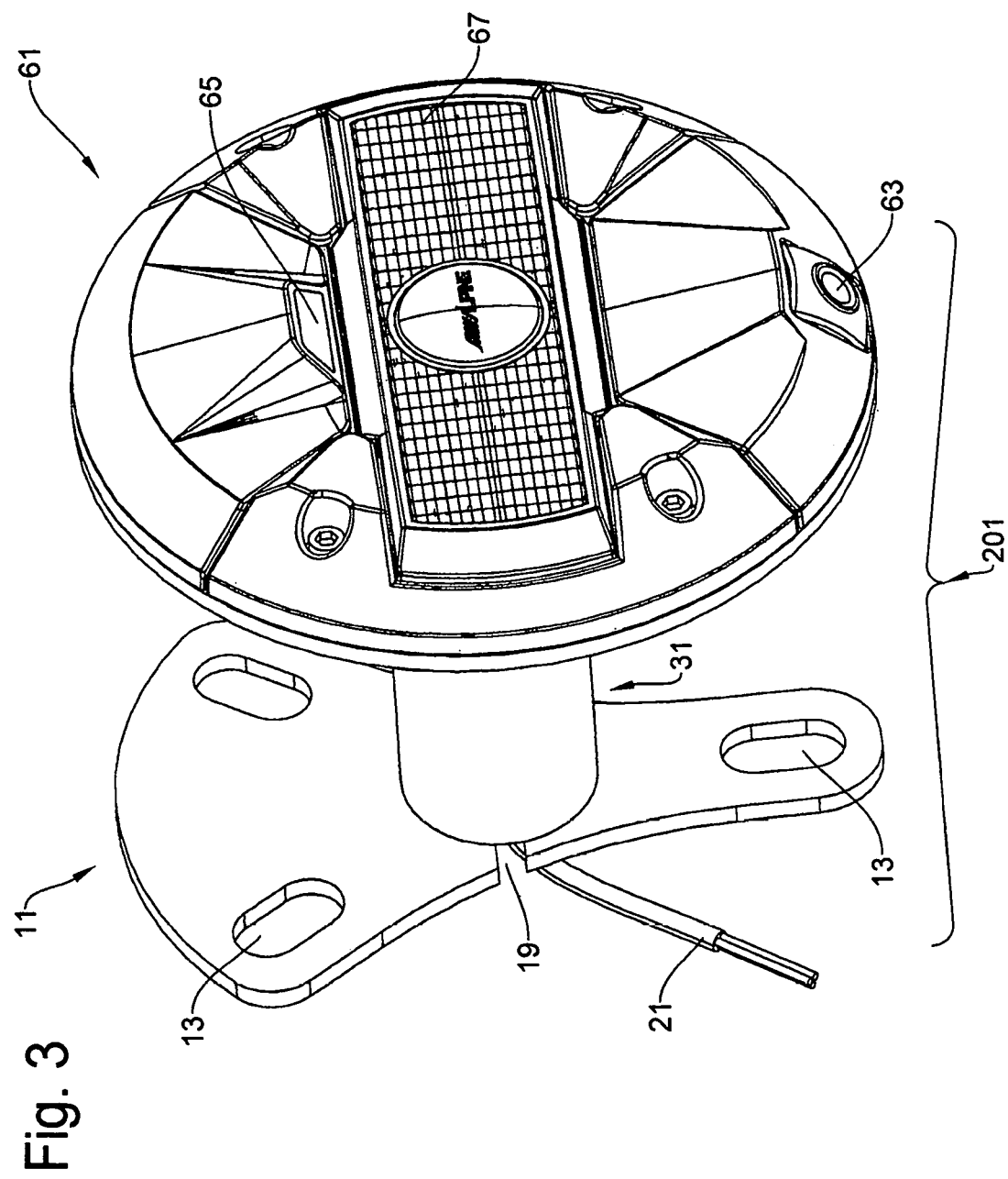

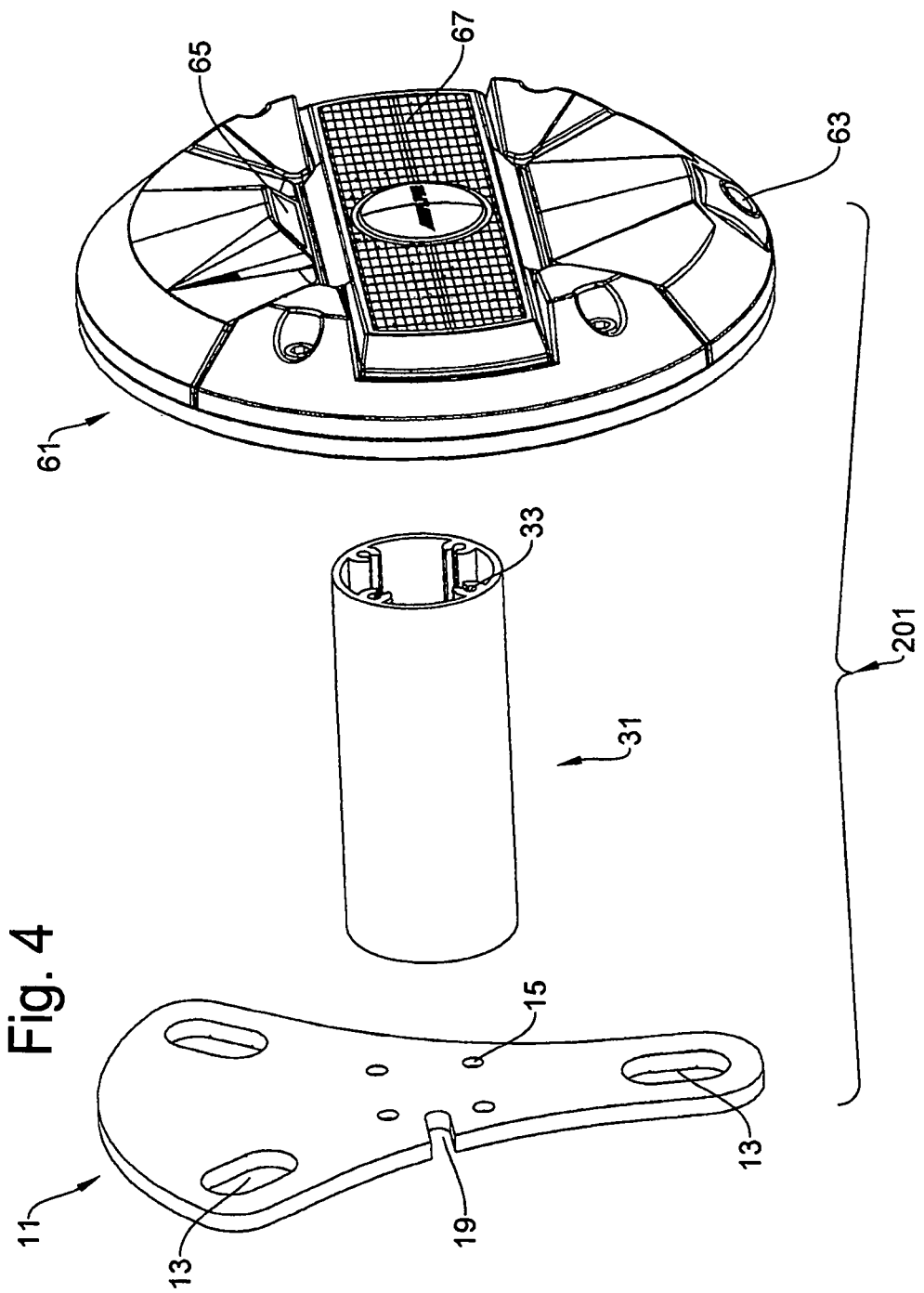

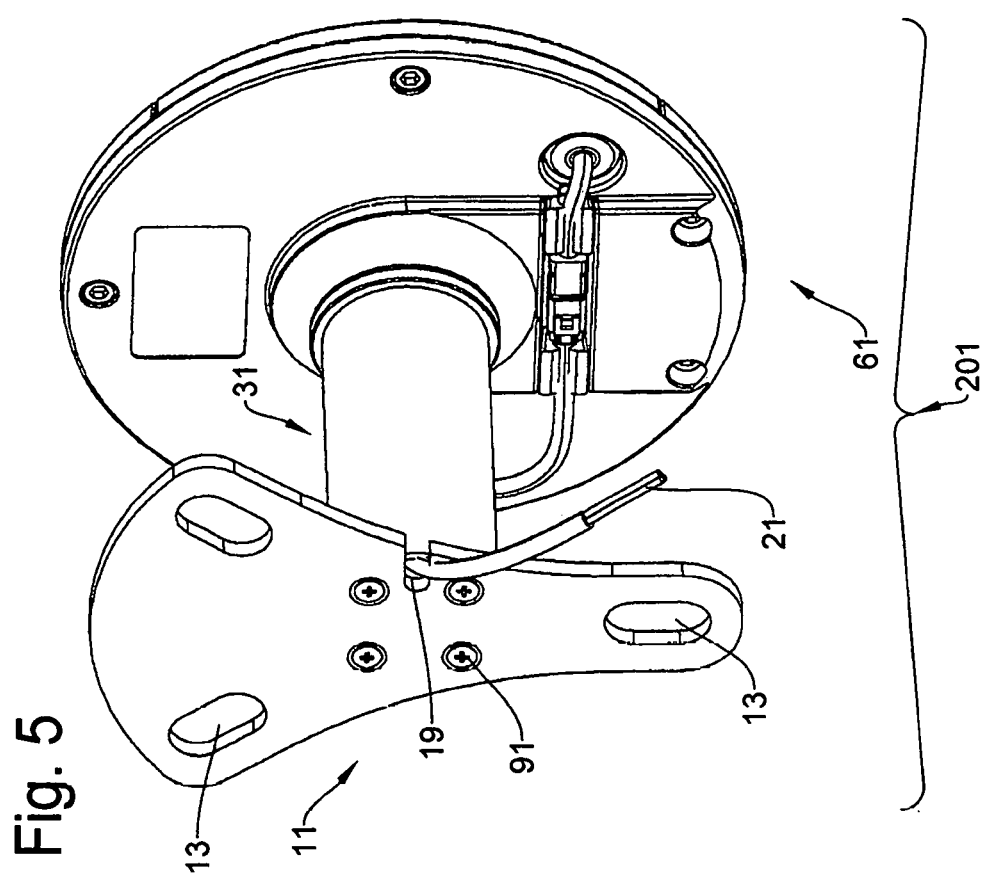

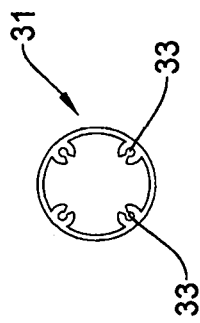
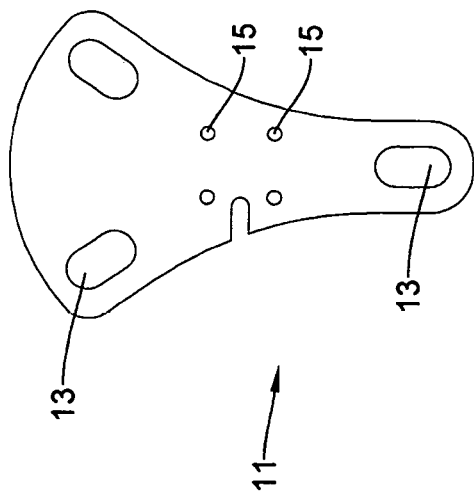
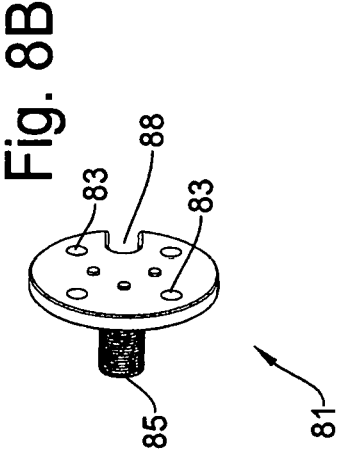
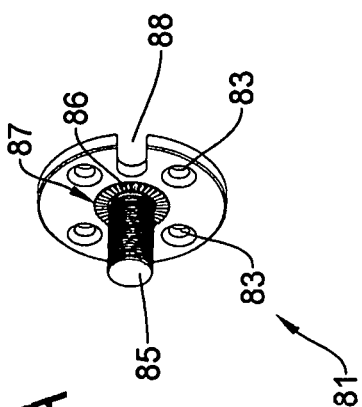

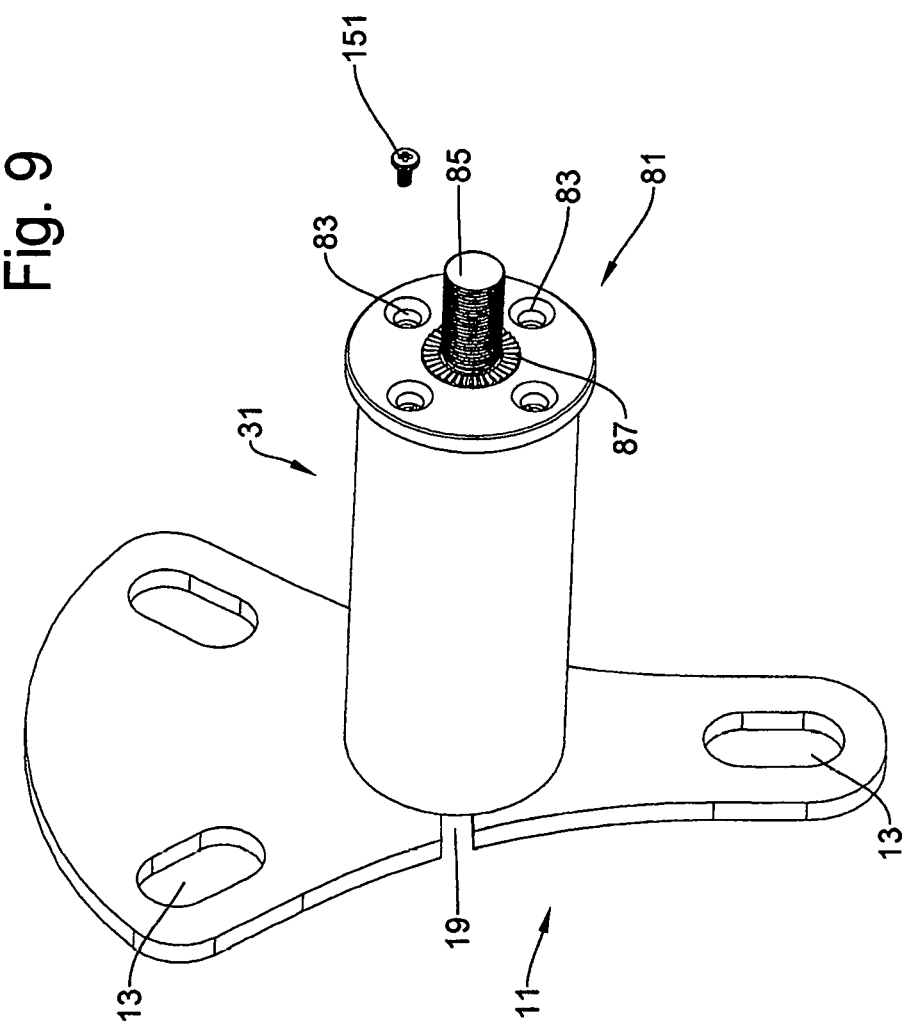

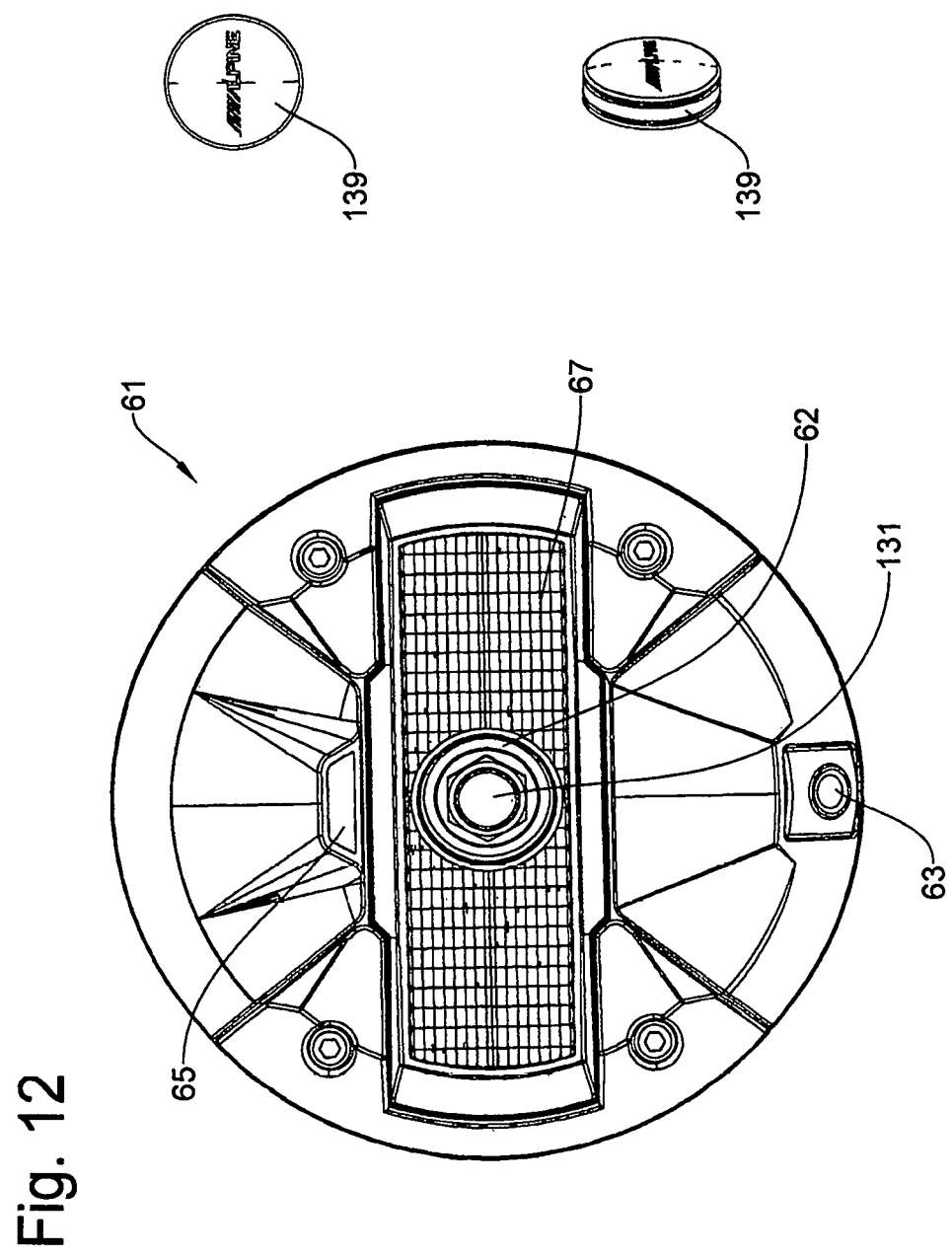

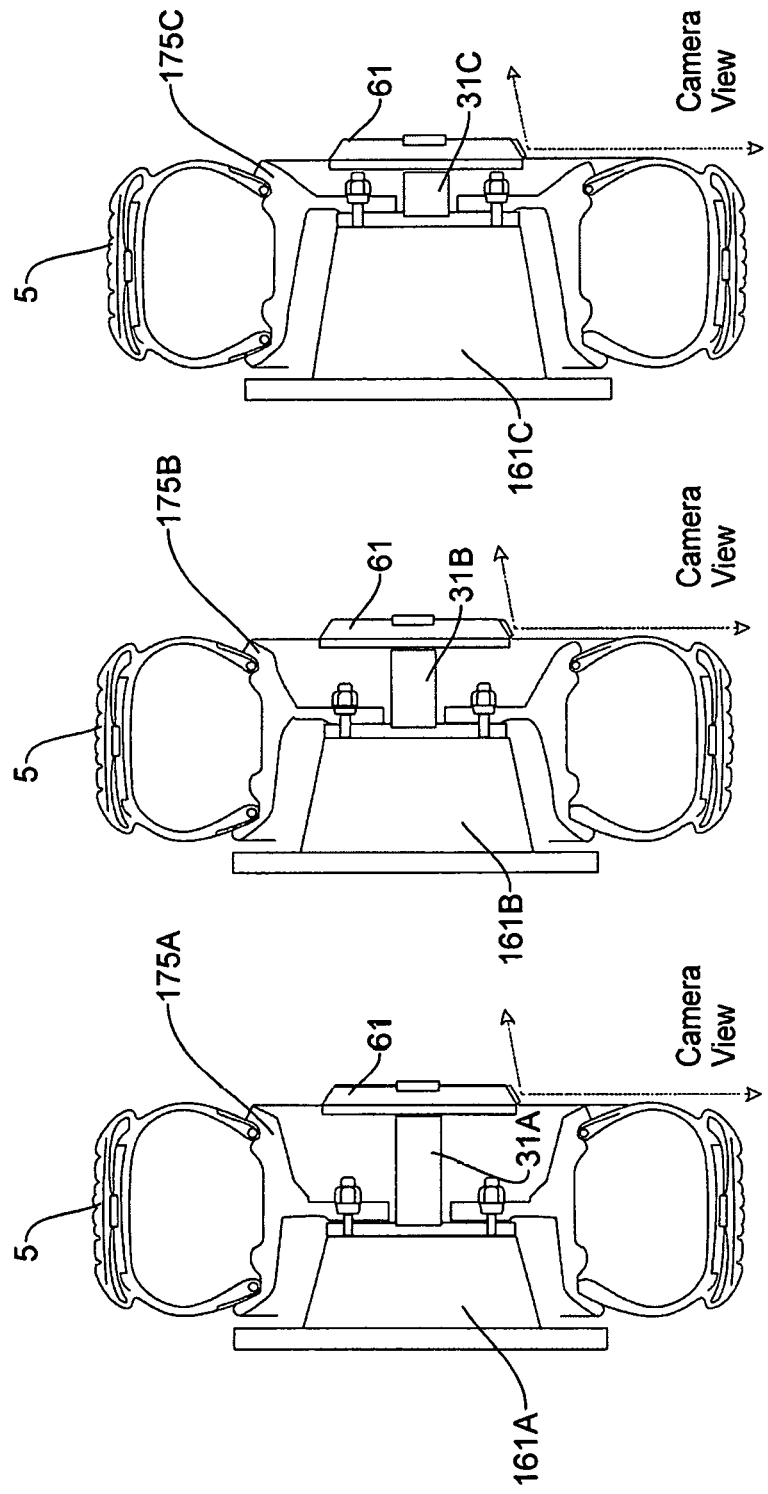

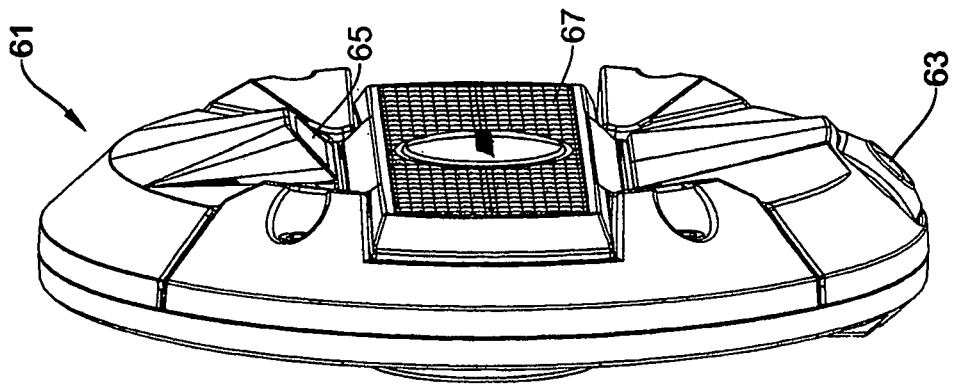
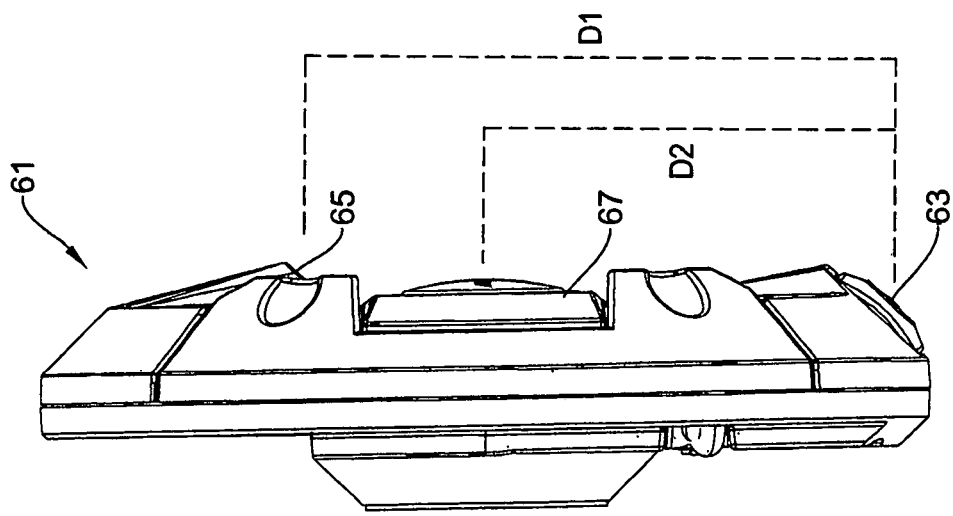

REAR-VIEW CAMERA AND LIGHT SYSTEM FOR VEHICLE

FIELD OF THE INVENTION

This invention relates to a rear-view camera and light system of a vehicle and its attachment structure, and more particularly, to a rear-view camera and light system having a rear-view camera, a back light, and a brake light for a vehicle and an attachment structure that attaches the system to a spare tire mount at the back of the vehicle.

BACKGROUND OF THE INVENTION

Today, rear-view cameras for vehicles are widely used to capture and convey images of the area behind the vehicle on a display within the vehicle, in order to aid drivers in safely performing reverse maneuvers. While such rear-view cameras are useful, some vehicles pose difficulty for installing a rear-view camera at an optimum location. The rear-view camera is preferably installed at the center of the back of the vehicle that enables the rear-view camera to capture a rear-view image with a wide and symmetrical range. Moreover, the rear-view camera is preferably installed at a location that allows the rear-view camera to produce a rear-view image that includes the view of the ground immediate to the back of the vehicle.

FIGS. 1A and 1B show an example of a vehicle that poses difficulties for installing a rear-view camera at such an optimal location at the back of the vehicle. As shown, this type of vehicle mounts a spare tire 5 at the back of the vehicle 1, as shown by side view of FIG. 1A. Referring to FIG. 1B showing the back of the vehicle 1, the spare tire 5 is mounted at about the center of the vehicle. Thus, in the case of the vehicle 1, the location that would be preferable to place a rear-view camera, i.e., on a longitudinal centerline, is already occupied by the spare tire 5.

If the rear-view camera is mounted at or near a number plate 6 shown in FIG. 1B, the placement of the rear-view camera would be off-center with respect to the horizontal direction of FIG. 1B, since the number plate 6 in this example is located at the left edge of the vehicle back. Thus, it is difficult for a rear-view camera mounted on or near the number plate 6 to provide a wide and right/left symmetrical rear-view for a driver. Moreover, the placement position of the rear-view camera at or near the number plate 6 would be undesirable in a vertical direction of FIG. 1B as well since the vertical position in this case may be too low to provide a view of the ground immediate to the back of the vehicle with adequate width and depth.

Further, for the vehicle 1 having the spare tire 5 mounted at the back of the vehicle as shown in FIGS. 1A and 1B, the mounted spare tire 5 can partially or entirely hide a brake light (third brake light) located at the center if the spare tire 5 is large. The example of FIG. 1B shows the case in that a brake light 3 is located at the back of the vehicle slightly above the upper edge of the spare tire 5. Depending on the size of the spare tire 5, the brake light 3 may become partially or completely obstructed by the spare tire 5. In many jurisdictions, a brake light (third brake light) located at the center of the vehicle is required.

A back light (reverse lamp or backup light) of a vehicle is used to warn nearby vehicle operators and pedestrians of a vehicle's backing motion as well as to provide appropriate lighting to the rear area for the driver when backing up. Depending on the placement of the spare tire, the back light provided on the vehicle may also be obstructed by the spare tire in the manner similar to that of the brake light noted above. Especially, the above noted problems become more serious for a type of vehicle which is designed for off-road use since the vehicle wheels and spare tire of such a vehicle are large.

Thus, there is a need for a rear-view camera and light system for a vehicle that will be mounted at an optimal location of the vehicle and an attachment structure that can easily and securely attach the system to a spare tire mount at the back of the vehicle.

SUMMARY OF THE INVENTION

It is, therefore, an object of the present invention to provide a rear-view camera and light system for a vehicle and an attachment structure to attach the rear-view camera and light system to an optimum position on the vehicle.

It is another object of the present invention to provide a rear-view camera and light system for a vehicle and an attachment structure for a type of vehicle that mounts a spare tire wheel at about the center of the back of the vehicle.

It is a further object of the present invention to provide a rear-view camera and light system for a vehicle and an attachment structure that enables the rear-view camera to be placed at an optimal position for capturing a rear-view image with a wide and symmetrical range of the area behind the vehicle.

It is a further object of the present invention to provide a rear-view camera and light system for a vehicle and an attachment structure to establish an ideal positional relationship among a rear-view camera, a brake light, and a back light on the hub of a spare tire.

The basic aspect of the present invention is a rear-view camera and light system for a vehicle having a rear-view camera, a back light, and a brake light, and an attachment structure that attaches the system to a center hub of a spare tire at the back of the vehicle. The rear-view camera and light system includes a mounting base having a plate like shape and is configured to attach to a mounting bracket provided on about a center of a back of a vehicle for mounting a spare tire, a mounting post having a cylindrical shape with a hollow therethrough and is configured to attach to the mounting base at one end, and a camera/light unit having circular shape and is configured to attach to another end of the mounting post.

The rear-view camera and light system of the present invention further includes an electric cable for electrically connecting the camera/light unit with electric components provided inside the vehicle. A slit is formed on the mounting base to introduce the electric cable from the camera/light unit via the hollow of the mounting post to the electric components in the inside of the vehicle.

The rear-view camera and light system of the present invention further includes a lug nut camera base provided between the another end of the mounting post and the camera/light unit. The lug nut camera base has a camera base bolt at its center so that the camera/light unit is connected to the lug nut camera base by the camera base bolt with use of a lug nut. Preferably, the lug nut is a locking nut to prevent theft which requires a special adaptor between the nut and a wrench to remove the camera base bolt.

In the rear-view camera and light system of the present invention, the brake light is located at about the center of the camera/light unit and is extended in a horizontal direction, the back light is provided at an upper location of the camera/light unit, and oriented to face diagonally downward, and the rear-view camera is provided at a lower location of the camera/light unit, and oriented to face diagonally downward. The rear-view camera is positioned at the lower location of the camera/light unit and is separated from the back light and break light by predetermined distances to reduce interference of light with images captured by the rear-view camera.

The rear-view camera and light system of the present invention further includes a plurality of mounting posts with different lengths. A mounting post with an appropriate length is selected depending on the size and depth of the spare tire wheel, thereby maintaining the optimum location of the camera/light unit whereby the rear-view camera is positioned to capture images of the ground immediate to the back of the vehicle, regardless of type or size of spare tire wheel.

Because the vehicular rear-view camera and light system of the present invention is assembled and attached to the vehicle in the manner described above, the following advantages can be obtained. The placement of the camera/light unit enables the rear-view camera to capture longitudinally centered rear-view images, which satisfies requirements for rear visibility. The placement of the back light and break light above and sufficiently separated from the rear-view camera reduces light interference with the capture of images. The varying length of the mounting post allows easy adjustment of the rear-view camera positioning so that the view of the ground immediate to the back of the vehicle can be captured. The brake light located at the center back satisfies the requirement of the center stop lamp, since the center stop lamp (center high mount stop lamp or third brake light) is required by regulations worldwide to be centered laterally on the vehicle.

BRIEF DESCRIPTION OF THE DRAWINGS

FIG. 3 is a perspective view showing an example of the structure of the vehicle rear-view camera and light system of the present invention.

FIG. 4 is an exploded perspective view showing the vehicle rear-view camera and light system of the present invention disassembled into main parts.

FIG. 5 is a perspective view showing the vehicle rear-view camera and light system of the present invention seen from a direction opposite to that of FIG. 3.

FIG. 6 is a plan view of a mounting plate used for attachment of the vehicle rear-view camera and light system of the present invention.

FIG. 7 is a plan view of a mounting post used for attachment of the vehicle rear-view camera and light system of the present invention.

FIG. 8A is a perspective view showing a lug nut camera base of the vehicle rear-view camera and light system of the present invention.

FIG. 8B is another perspective view showing a lug nut camera base of the vehicle rear-view camera and light system of the present invention as seen from an angle different from that of FIG. 8A.

FIG. 9 is a perspective view showing a structural relationship among the mounting base, the mounting post and the lug nut camera base involved in the present invention.

FIG. 12 is a front view showing the camera/light unit incorporated in the vehicle rear-view camera and light system when the lug nut is fastened but a cap is not fastened.

FIG. 15A is a cross-sectional side view of the mounting bracket, the spare tire, and the vehicle rear-view camera and light system with respect to one example of back spacing of the spare tire wheel.

FIG. 15B is a cross-sectional side views of the mounting bracket, the spare tire, and the vehicular rear-view camera and light system with respect to another example of back spacing of the spare tire wheel.

FIG. 15C is a cross-sectional side views of the mounting bracket, the spare tire, and the vehicular rear-view camera and light system with respect to a further example of back spacing of the spare tire wheel.

FIG. 16A is a side view of the camera/light unit that illustrates the positional relationship among the rear-view camera, the back light, and the brake light involved in the present invention.

FIG. 16B is a perspective view of the camera/light unit that illustrates the positional relationship among the rear-view camera, the back light, and the brake light involved in the present invention.

DETAILED DESCRIPTION OF THE PREFERRED EMBODIMENT

The present invention will be described in detail with reference to the accompanying drawings. The vehicle rear-view camera and light system and its attachment structure of the present invention is designed to mount a rear-view camera, a brake light, and a back light at optimal locations on the back of the vehicle. The vehicle rear-view camera and light system and its attachment structure of the present invention is advantageously implemented on a type of vehicle which mounts a spare tire at about the center of the back of the vehicle. It should be noted that within the context of the present invention, "spare tire" and "spare tire wheel" are interchangeably used.

Figure 1B:
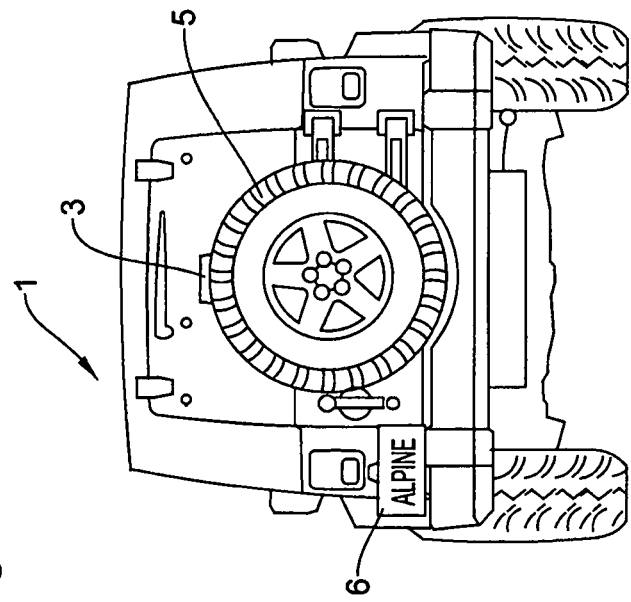
FIG. 1B is a back view of a vehicle showing another example of problems involved in mounting a rear-view camera at an optimum location. The rear-view camera and light system of the present invention can be advantageously implemented on such a vehicle.
Figure 1A:
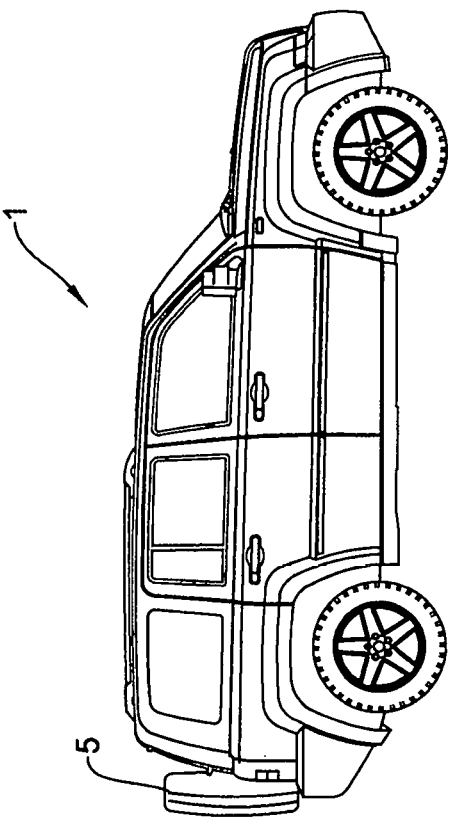
FIG. 1A is a side view of a vehicle showing an example of problems involved in mounting a rear-view camera at an optimum location. The rear-view camera and light system of the present invention can be advantageously implemented on such a vehicle.
Figure 2:
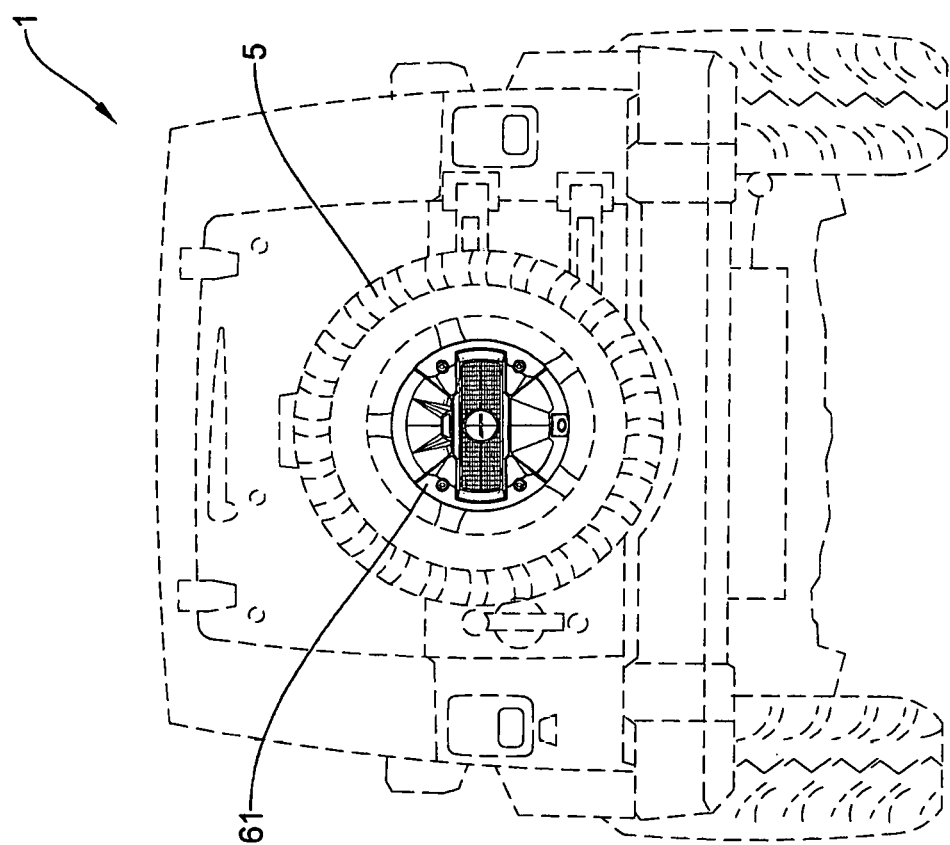
FIG. 2 is a front view of the rear-view camera and light system of the present invention which is installed at the center hub of a spare tire at the back of a vehicle in which the vehicle and spare tire are illustrated by dotted lines.

FIG. 2 shows a back of a vehicle 1 similar to that shown in FIG. 1B, except that the vehicle rear-view camera and light system of the present invention is installed at the center hub of a spare tire 5. As shown in FIG. 3, the vehicle rear-view camera and light system 201 of the present invention is mainly configured by a mounting base 11, a mounting post 31, and a camera/light unit 61. In FIG. 2, only the camera/light unit 61 of the vehicle rear-view camera and light system 201 is visible. Further in FIG. 2, for the purpose of illustration, the vehicle 1 and the spare tire 5 are illustrated by dotted lines. The camera/light unit 61 is mounted at a hub of the spare tire wheel, and accordingly, the camera/light unit 61 is located at about the center of the back of the vehicle.

FIG. 3 is a perspective view showing the basic structure of the vehicle rear-view camera and light system 201 of the present invention. The vehicle rear-view camera and light system 201 is mainly composed of a mounting base 11, a mounting post 31, and a camera/light unit 61. The camera/light unit 61 has a circular shape and includes a rear-view camera 63, a back light 65, and a brake light 67. The mounting base 11 and the mounting post 31 are provided to attach the camera/light unit 61 to the hub of the spare tire wheel.

In this example, the brake light 67 (stop lamp) is located at the center of the camera/light unit 61 and is activated when the driver applies the vehicle's brakes. The brake light 67 operates as what is commonly known as a "center brake lamp", a "third brake light" or an "eye-level brake lamp" that satisfies the requirements for a center high mount stop lamp in many jurisdictions. For this purpose, it is preferable that the brake light 67 is a red light, has a sufficient size, and a horizontally extended rectangular shape to be clearly discernible by other drivers, pedestrians, etc. when activated.

The back light 65 located above the brake light 67 is to warn nearby vehicle operators and pedestrians of a vehicle's backup motion, as well as to provide sufficient illumination to the rear area for the driver. The rear-view camera 63 is located below the brake light 67 at the bottom (lower portion) of the camera/light unit 61. As will be described later in detail, the rear-view camera 63 is positioned so that the view angle of the rear-view camera 63 satisfies the field of view for rear visibility. In a preferred embodiment, the brake light 67 and the back light 65 are configured by LED (Light Emitting Diode) lights for illumination, although incandescent light, neon tube or halogen light may also be used.

The mounting base 11 has basically a plate like shape and attaches to a mounting bracket (for a spare tire) of the vehicle as will be described in detail later. The mounting base 11 has mount bolt holes 13 for fastening and a slit 19 for an electric cable 21. The mounting post 31 connects the mounting base 11 and the camera/light unit 61 at the center opening of the spare tire.

FIG. 4 is an exploded perspective view showing the vehicle rear-view camera and light system 201 of the present invention disassembled into main parts. Screw holes 15 on the mounting base 11 are arranged to correspond to screw holes 33 of the mounting post 31. The mounting post 31 has a cylindrical shape with hollow interior that penetrates from one end to the other. In FIG. 4, the screw holes 33 of the mounting post 31 are shown on only the right end, however, the left end of the mounting post 31 also has screw holes 33. The screw holes 33 of the right end are used to connect to a lug nut camera base 81 (see FIGS. 8A-8B and 9) and the screw holes 33 of the left end are used to connect to the mounting base 11.

FIG. 5 is a perspective view of the rear-view camera and light system 201 as viewed from a direction opposite to that of FIG. 3. Screws 91 are inserted into the screw holes 15 of the mounting base 11 and the screw holes 33 of the mounting post 31, thereby securely connecting the mounting base 11 and the mounting post 31. In the above example, four screw holes 15 and four corresponding screw holes 33 on one end of the mounting post 31 are provided. However, the number of the screw holes is not limited to four and may be varied as suited. Other fastening means may be used to connect the mounting base 11 and the mounting post 31.

The electric cable 21 from the camera/light unit 61 runs through the inside of the mounting post 31 and exits through the slit 19 of the mounting base 11. Then, the electric cable 21 will be introduced to the inside of the vehicle and electrically connects the camera/light unit 61 to electronic components of the vehicle. Thus, the electric cable 21 transmits brake signals and back signals of the vehicle to the camera/light unit 61 to activate the brake light 67 and back light 65. Images taken by the rear-view camera 63 of the camera/light unit 61 are transmitted via the electric cable 21 to a display of a vehicle headunit so that the user is able to see the rear-view images.

FIG. 6 is a plan view showing an example of structure of the mounting base 11. The mounting base 11 has a plurality of mount bolt holes 13. In this example, the mount bolt holes 13 have a shape of elongated circle. The screw holes 15 are positioned to correspond to the screw holes 33 of the mounting post 31 as noted above.

Figure 14:
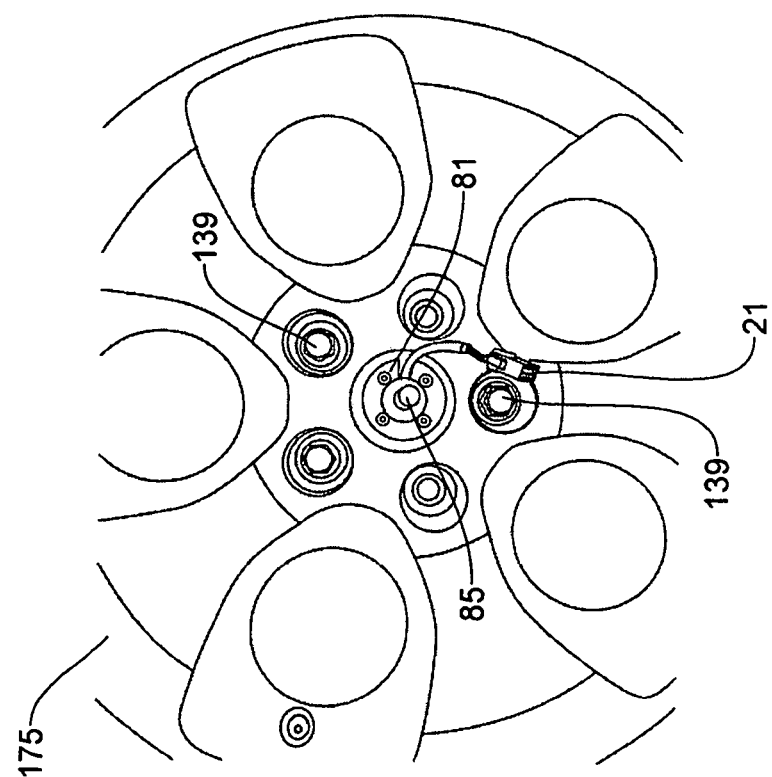
FIG. 14 is a front view showing a situation where a spare tire is inserted by bolts of the mounting bracket and the mounting post, and fastened by lug nuts.
Figure 13:
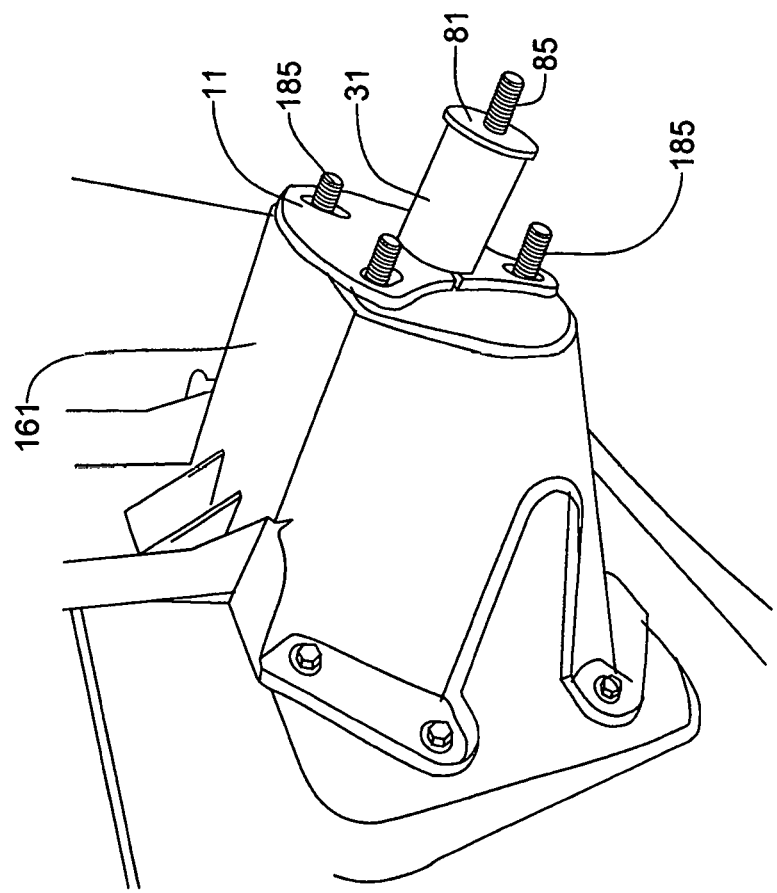
FIG. 13 is a perspective view showing a mounting bracket at the back of the vehicle and a mounting base inserted by bolts of the mounting bracket as an attachment structure of the vehicle rear-view camera and light system of the present invention.

The mounting base 11 is described in more detail with reference to FIGS. 13 and 14. In FIG. 13, the mount bolt holes 13 are arranged to be inserted by bolts 185 that extend from a mounting bracket 161 of the vehicle. After the mounting base 11 is placed on the back of the mounting bracket 161 by means of the mount bolt holes 13 and the bolts 185, a spare tire wheel 175 is mounted by inserting the bolts 185 into bolt holes of the spare tire wheel 175. As shown in FIG. 14, the center bore of the spare tire wheel 175 is inserted by the mounting post 31 (shown in FIG. 13). Lug nuts 139 fasten the spare tire wheel 175 as shown in FIG. 14, and at the same time, the mounting base 11 is secured at the back of the mounting bracket 161.

FIG. 7 is a plan view (cylinder top view) showing a structure of the mounting post 31. One end of the mounting post 31 has screw holes 33 positioned to correspond to the screw holes 15 of the mounting base 11. The other end of the mounting post 31 has screw holes 33 positioned to correspond to screw holes 83 of a lug nut camera base 81.

FIGS. 8A and 8B are perspective views showing an example of a lug nut camera base 81 of the vehicle rear-view camera and light system 201 of the present invention. The lug nut camera base 81 has a camera base bolt 85 at the center. A first face gear 87 is provided proximate to the camera base bolt 85. A slit 88 is provided so that the electric cable 21 connecting to the camera/light unit 61 may be threaded through the hollowed inside of the mounting post 31. As shown in FIG. 14, the electric cable 21 passes through the slit 88 and the mounting post 31, thus electrically connects the camera/light unit 61 to the electronic components of the vehicle. For example, the electric cable 21 connects to an auxiliary input of the headunit (not shown) of the vehicle.

FIG. 9 is a perspective view showing the mounting base 11, the mounting post 31 and the lug nut camera base 81 assembled with one another. The lug nut camera base 81 is securely connected to the mounting post 31 by screws 151 that are inserted to the screw holes 83 of the lug nut camera base 81 and the screw holes 33 of the mounting post 31. The camera base bolt 85 is outwardly oriented and is used to fasten the camera/light unit 61. A first face gear 87 is provided proximate to the camera base bolt 85 and is used to position the camera/light unit 61 in combination with the second face gear 105 shown in FIG. 10. While the preferred embodiment shown in FIG. 9 is composed by assembling the mounting base 11, the mounting post 31 and the lug nut camera base 81 by fastening with screws 151, they may also be formed integrally as a single piece.

Figure 10:
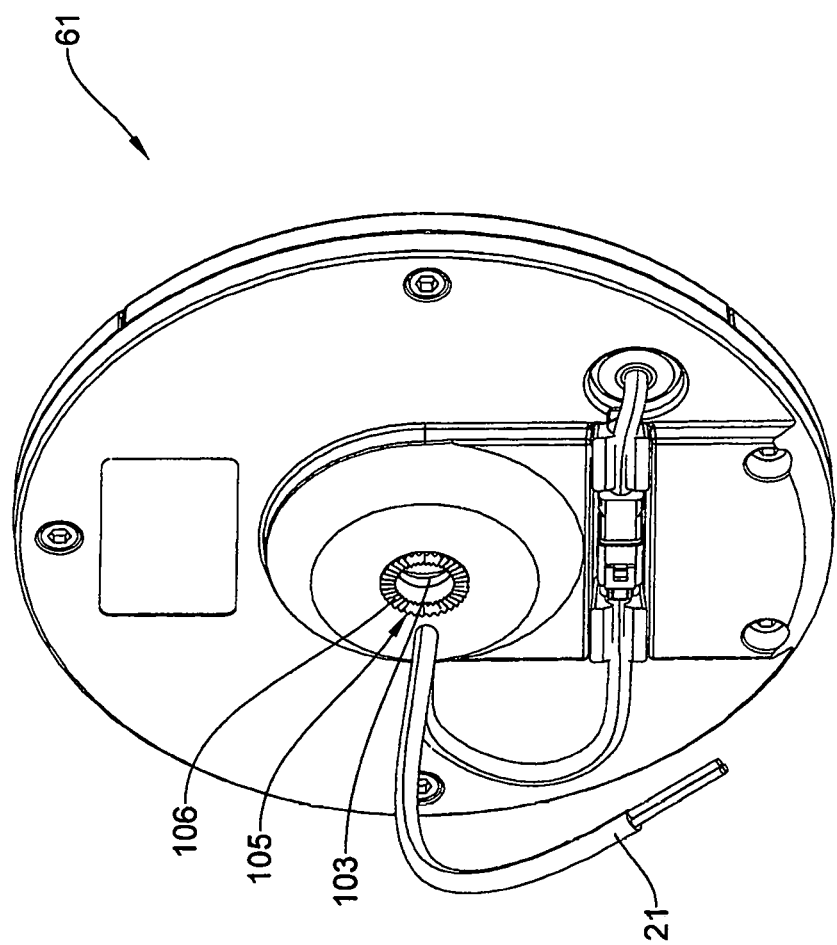
FIG. 10 is a perspective rear view showing an example of a structure of a camera/light unit incorporated in the vehicle rear-view camera and light system of the present invention.

FIG. 10 is a perspective rear view showing an example of structure of the camera/light unit 61 incorporated in the vehicle rear-view camera and light system 201 of the present invention. A bolt opening 103 is provided at the center to allow the camera base bolt 85 on the lug nut camera base 81 to pass through. For this purpose, the bolt opening 103 has a diameter slightly larger than the diameter of the camera base bolt 85.

A second face gear 105 is positioned around the bolt opening 103 in order to mesh with corresponding teeth 86 of the first face gear 87 of the lug nut camera base 81 noted above. The teeth 106 of the second face gear 105 and the teeth 86 of the first face gear 87 are designed so that each tooth 106 of the second face gear meshes with the teeth 86 of the first face gear 87 on the lug nut camera base 81.

During installation of the rear-view camera and light system 201 of the present invention, the light/camera unit 61 may become rotationally misaligned. Accordingly, the intermeshing first face gear 87 and second face gear 105 allows the user to finely rotate and adjust the light/camera unit 61 into an optimal position by manipulating the light/camera unit 61 so that the teeth 106 of the second face gear 105 slides over the teeth 86 of the first face gear 87 and meshes into the desired position.

In the examples of this embodiment, the first face gear 87 and second face gear 105 each includes 36 teeth which allows for fine rotational adjustment of the light/camera unit 61 in 10 degree increments, however, the number of teeth on each face gear may be varied as suited as long as they serve to position and fix the camera/light unit 61.

Figure 11:
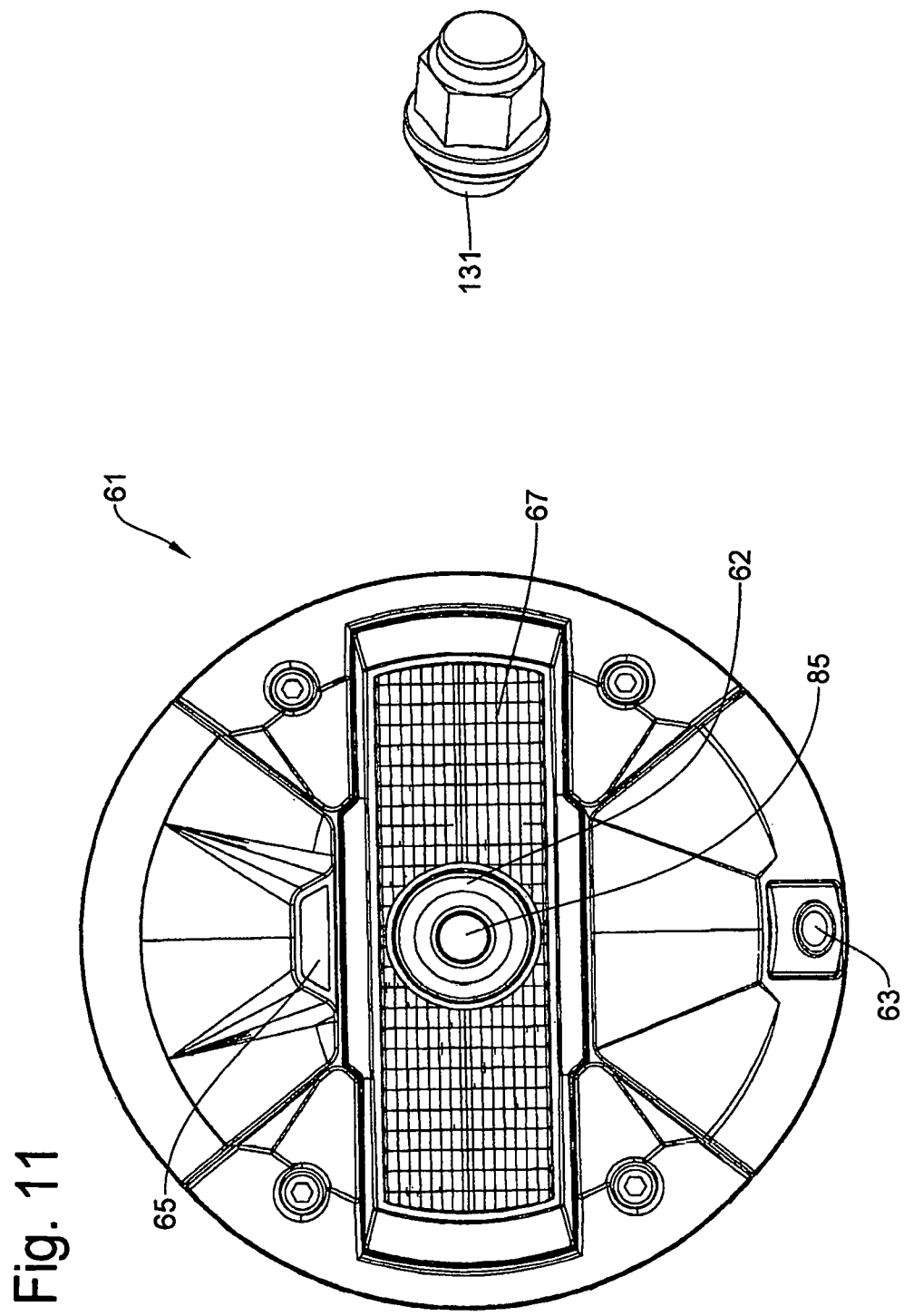
FIG. 11 is a front view showing the camera/light unit incorporated in the vehicle rear-view camera and light system when a lug nut is not fastened.

FIG. 11 is a front view showing the camera/light unit 61 incorporated in the vehicle rear-view camera and light system 201 of the present invention. In a preferred embodiment, the camera/light unit 61 has a diameter of about 180 mm, but the diameter may be varied as suited. At the center, the camera base bolt 85 of the lug nut camera base 81 passes through the bolt opening 103 from the back of the camera/light unit 61.

A front opening 62 is a through hole, the other end of which is the bolt opening 103 of the back of the camera/light unit 61, and has a size to accommodate a lug nut 131. By screwing the lug nut 131 from the front opening 62 into the camera base bolt 85, the camera/light unit 61 is fixed to the lug nut camera base 81. As a result, the camera/light unit 61 is attached to the center hub of the spare tire wheel. In a preferred embodiment, the lug nut 131 is a locking nut (also referred to as "anti-theft nut" or "wheel lock") to prevent theft. Locking nuts require a special adaptor ("key") between the nut and a wrench to fit and remove. The key is normally unique to each set of nuts. An example of locking nuts is described in U.S. Pat. No. 3,930,428, which is herein incorporated by reference in its entirety. Although the locking nut is preferable for an anti-theft purpose, it is also possible to use a normal lug nut for attaching the camera/light unit 61.

FIG. 12 is a front view showing the camera/light unit 61 of the present invention where the lug nut 131 is fastened from the front opening 62 to the camera base bolt 85. Once the lug nut 131 is securely fastened and the camera/light unit 61 is securely fixed to the lug nut camera base 81, a cap 139 may be snugged or screwed into the front opening 62, thereby concealing the lug nut 131.

As described above, the mounting base 11 is secured to the mounting bracket 161 by fastening the lug nut 139 to the spare tire wheel 175 of the spare tire 5 (see FIG. 14). The mounting post 31 passes through the center bore of the spare tire wheel 175 so that the camera/light unit 61 is mounted at the center hub of the spare tire wheel 175. The spare tire 5 (spare tire wheel 175) are placed between the mounting base 11 and the camera/light unit 61. As shown in FIG. 2, the camera/light unit 61 is installed at the center of the vehicle back, and accordingly, the rear-view camera 63 is positioned at the center of the vehicle width.

Depending on the type and size of the spare tire and the mounting bracket of the vehicle, the dimension of the back spacing between the spare tire wheel and the mounting bracket may vary. FIGS. 15A-15C are cross sectional side views showing various lengths of the mounting post 31 of the present invention to correspond to different back spacings of the spare tire wheel with the mounting bracket. Each of FIGS. 15A-15C includes the mounting bracket 161, the spare tire 5, the spare tire wheel 175, the mounting post 31 and the camera/light unit 61.

FIG. 15A shows the case of a shallow (short) back spacing in which the length of the mounting post 31A for the spare tire wheel 175A is longest. FIG. 15C shows the case of a deep (long) back spacing in which the length of the mounting post 31C for the spare tire wheel 175C is shortest. FIG. 15B shows the case of an intermediate back spacing in which the length of the mounting post 31B for the spare tire wheel 175B is longer than the mounting post 31C and shorter than the mounting post 31A. In this manner, the length of the mounting post 31 enables the appropriate placement of the camera/light unit 61.

The vehicle rear-view camera is required to satisfy certain conditions to serve its purpose of vehicle safety in backing operation. For the purpose of setting standards for rear-view cameras, the National Highway Traffic Safety Administration (NHTSA) promulgates federal motor vehicle safety standards for rear visibility. In order to satisfy the requirements set forth by NHTSA, an optimal placement of the rear-view camera is required. The optimum placement of the camera/light unit 61 is determined by the view angle of the rear-view camera 63. In the example of FIGS. 15A-15C, the view angle is represented by dotted line arrow extending from the rear-view camera located at the lower portion of the camera/light unit 61. The length of the mounting post 31 is preferably long enough so that the rear-view camera is able to capture images unobstructed by the spare tire wheel or other vehicle components.

For installation of the camera/light unit 61, the mounting post 31 may be provided in various lengths to accommodate spare tire wheels and mounting brackets of various sizes and depths. For instance, a long type (FIG. 15A) of the mounting post 31A may have a length of 108.0 mm, an intermediate type (FIG. 15B) of the mounting post 31B may have a length of 76.2 mm, and a short type (FIG. 15C) of the mounting post 31C may have a length of 44.4 mm.

FIG. 16A is a side view of the camera/light unit 61 and FIG. 16B is a perspective view of the camera/light unit 61 to describe the positional relationship among the rear-view camera 63, the back light 65, and the brake light 67 involved in the present invention. When the camera/light unit 61 is attached to the back of the vehicle via the mounting post 31 and the mounting base 11, the back light 65 is positioned above the brake light 67 and the rear-view camera 63 is positioned below the brake light 67. The back light 65 illuminates the area surrounding the rear of the vehicle, and is mounted higher than the rear-view camera 63 to produce a wider and clearer rear image.

The placement of the back light 65, brake light 67 and the rear-view camera 63 reduces light interference with images captured by the rear-view camera 63 in order to avoid undesirable image effects such as "wash-out" or "over exposure". Further, the rear-view camera 63 is angled diagonally downward in order to decrease light interference from the back light 65 and break light 67.

In a preferred embodiment, the distance D1 between the back light 65 and the rear-view camera 63 is designed to be about 120 mm. The distance D1 between the back light 65 and the rear-view camera 63 may take the range between 40 mm to 180 mm. The distance D2 between the brake light 67 and the rear-view camera 63 may take the range between 20 mm to 140 mm. By having the appropriate distance D1 between the back light 65 and the rear-view camera 63, and the appropriate distance D2 between the brake light 67 and the rear-view camera 63, light interference with images captured by the rear-view camera 63 can be reduced or prevented. Similar to the rear-view camera 63, the back light 65 is oriented to face diagonally downward when installed on the hub of the spare tire 5 at the back of the vehicle.

According to the present invention, because the vehicular rear-view camera and light system of the present invention is assembled and attached to the vehicle in the manner described above, the following advantages can be obtained. The placement of the camera/light unit 61 enables the rear-view camera 63 to capture longitudinally centered rear-view images, which satisfies requirements for rear visibility. The placement of the back light 65 and brake light 67 above the rear-view camera 63 reduces the light interference with images. The varying length of the mounting post 31 allows easy adjustment of the rear-view camera 63 positioning so that the view of the ground immediate to the back of the vehicle can be captured. The brake light 67 located at the center back satisfies the center stop lamp requirement, since the center stop lamp (center high mount stop lamp or third brake light) is required by regulations worldwide to be centered laterally on the vehicle.

Although the vehicular rear-view camera and light system of the present invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A rear-view camera and light system for a vehicle, comprising:
   a mounting base having a plate like shape and configured to attach to a mounting bracket provided on a back of a vehicle for mounting a spare tire;
   a mounting post configured to attach to the mounting base at one end, and to pass through a center bore of the spare tire, which is a center hole in a wheel of the spare tire, wherein the mounting post is cylindrical shape having a hollow space therein; and
   a camera/light unit configured to attach to another end of the mounting post, the camera/light unit including a rear-view camera, a back light, and a brake light;
   wherein the camera/light unit is attached at a hub of the spare tire via the mounting base and the mounting post, and wherein:
   the brake light is located at about a center of the camera/light unit and is extended in a horizontal direction;
   the back light is provided at an upper location of the camera/light unit, and oriented to face diagonally downward; and
   the rear-view camera is provided at a lower location of the camera/light unit, and oriented to face diagonally downward.

2. The rear-view camera and light system for a vehicle as defined in claim 1, further comprising:
   an electric cable for electrically connecting the camera/light unit with electric components provided inside of the vehicle, the electric cable being configured to run through the hollow space of the mounting post.

3. The rear-view camera and light system for a vehicle as defined in claim 2, further comprising:
   a slit formed on the mounting base to introduce the electric cable from the camera/light unit to the electric components in the inside of the vehicle.

4. The rear-view camera and light system for a vehicle as defined in claim 1, further comprising:
   a lug nut camera base provided between the another end of the mounting post and the camera/light unit;
   wherein the lug nut camera base has a camera base bolt at its center so that the camera/light unit is connected to the lug nut camera base by the camera base bolt with use of a lug nut.

5. The rear-view camera and light system for a vehicle as defined in claim 4, wherein:
   the lug nut is a locking nut to prevent theft which requires a special adaptor between the nut and a wrench to remove from the camera base bolt.

6. The rear-view camera and light system for a vehicle as defined in claim 4, further comprising:
   a first face gear provided on the camera/light unit and a second face gear provided on the lug nut camera base;
   wherein the first face gear includes a first set of teeth that meshes with a second set of teeth provided on the second face gear, thereby the light/camera unit is rotatably adjustable around a center axis when the camera/light unit is attached to another end of the mounting post.

7. The rear-view camera and light system for a vehicle as defined in claim 6, wherein:
   the first set of teeth of the first face gear includes 36 teeth and the second set of teeth of the second face gear includes 36 teeth.

8. The rear-view camera and light system for a vehicle as defined in claim 1, wherein:
   the rear-view camera at the lower location of the camera/light unit is separated from the back light by a predetermined distance, whereby reducing light interference of images.

9. The rear-view camera and light system for a vehicle as defined in claim 8, wherein:
   the predetermined distance between the rear-view camera and the back light is in a range between 40 mm and 180 mm.

10. The rear-view camera and light system for a vehicle as defined in claim 1, wherein:
    the rear-view camera at the lower location of the camera/light unit is separated from the break light by a predetermined distance, whereby reducing light interference of images.

11. The rear-view camera and light system for a vehicle as defined in claim 10, wherein:

the predetermined distance between the rear-view camera and the break light is in a range between 20 mm and 140 mm.

12. The rear-view camera and light system for a vehicle as defined in claim 1, further comprising:
a plurality of mounting posts with different lengths;
wherein the mounting post with an appropriate length is selected depending on difference in back spacing of a spare tire wheel with the mounting bracket, thereby maintaining the location of the camera/light unit regardless of types of spare tire wheel and depths of mounting bracket to capture an image of ground immediate to the back of the vehicle.

13. The rear-view camera and light system for a vehicle as defined in claim 1, wherein:
the mounting post has a cylindrical shape with a hollow therethrough.

14. The rear-view camera and light system for a vehicle as defined in claim 1, wherein:
the camera/light unit has a circular shape and is attached at a center of the hub of the spare tire.

* * * * *